United States Patent
Koeninger

(10) Patent No.: US 9,794,389 B2
(45) Date of Patent: Oct. 17, 2017

(54) HANDS-FREE BLUETOOTH CAR SYSTEM

(71) Applicant: International Business Machines Corporation, Armonk, NY (US)

(72) Inventor: R Kent Koeninger, Nashua, NH (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/219,729

(22) Filed: Jul. 26, 2016

(65) Prior Publication Data

US 2017/0034327 A1  Feb. 2, 2017

Related U.S. Application Data

(60) Provisional application No. 62/197,339, filed on Jul. 27, 2015.

(51) Int. Cl.
*H04M 1/60* (2006.01)
*H04W 4/00* (2009.01)

(52) U.S. Cl.
CPC ......... *H04M 1/6091* (2013.01); *H04W 4/008* (2013.01)

(58) Field of Classification Search
CPC combination set(s) only.
See application file for complete search history.

(56) References Cited

U.S. PATENT DOCUMENTS

| 2014/0273859 A1* | 9/2014 | Luna | H04W 4/008 |
| | | | 455/41.3 |
| 2016/0219431 A1* | 7/2016 | Belur | H04M 1/6075 |
| 2017/0013103 A1* | 1/2017 | Jakobsen | H04M 1/6066 |

* cited by examiner

*Primary Examiner* — Junpeng Chen
(74) *Attorney, Agent, or Firm* — Jeffrey S LaBaw; Feb Cabrasawan; Robert Sullivan

(57) ABSTRACT

A hands-free Bluetooth system is described. The Bluetooth system comprises a base unit and a controller unit. The controller includes a built-in speaker, a built-in microphone and a control button configured to receive an action from a user and transmit a signal which corresponds to the action to the base unit. The controller unit automatically pairs through Bluetooth to the base unit and directs audio signals received from the base unit to the built-in speaker. The base unit pairs through Bluetooth to a smartphone. The base connects to an audio system through an audio connection. Upon receiving a signal for an incoming call through the smartphone, the base unit tests whether it is connected to the speaker of the audio system. If it is connected, the base unit directs the incoming call to the audio system. However, if it is not connected, the base unit directs the incoming call to the controller.

19 Claims, 11 Drawing Sheets

HANDS-FREE BLUETOOTH CAR SYSTEM

TECHNICAL FIELD

Various embodiments relate to methods and systems for Bluetooth car systems, and in particular to smartphone hands-free Bluetooth car systems.

BRIEF SUMMARY

According to this disclosure, a hands-free Bluetooth system is described. The Bluetooth system comprises a base unit and a controller unit. The controller includes a built-in speaker, a built-in microphone and a control button configured to receive an action from a user and transmit a signal which corresponds to the action to the base unit. The controller unit automatically pairs through Bluetooth to the base unit and directs audio signals received from the base unit to the built-in speaker. The base unit pairs through Bluetooth to a smartphone. The base connects to an audio system through an audio connection. Upon receiving a signal for an incoming call through the smartphone, the base unit tests whether it is connected to the speaker of the audio system. If it is connected, the base unit directs the incoming call to the audio system. However, if it is not connected, the base unit directs the incoming call to the controller.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

DETAILED DESCRIPTION OF THE DRAWINGS

Figure 1:
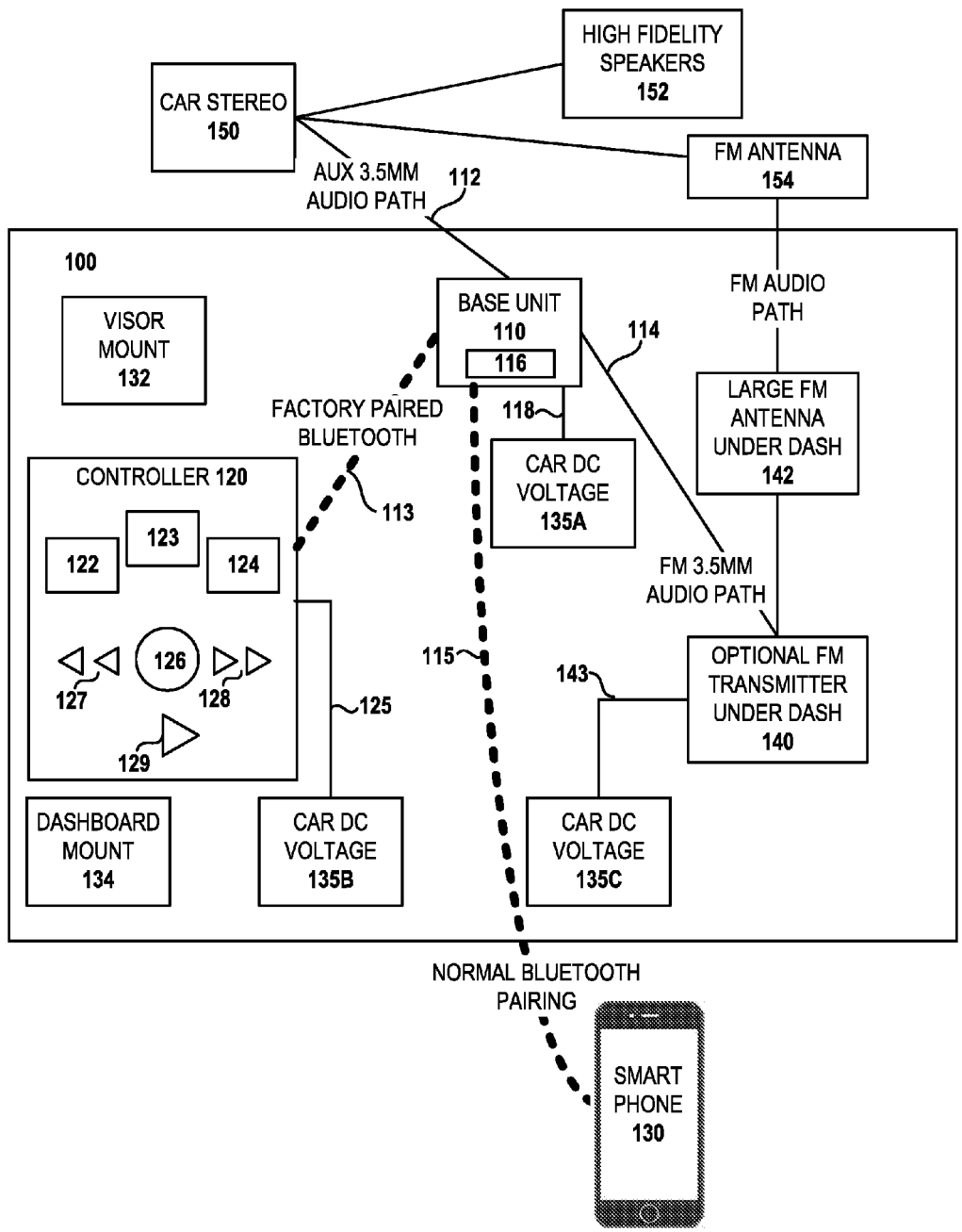
FIG. 1 illustrates a system according to some embodiments of the invention.

The following detailed description refers to the accompanying drawings. The same or similar reference numbers or identifications may be used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

Various embodiments disclose methods and a system for a hands-free Bluetooth adapter system as described below. In some embodiments, the adapter system is called a Virtuoso system.

The following describes some of the features in various embodiments and the mechanisms for implementing those features.

In one preferred embodiment, the invention comprises a smartphone hands-free Bluetooth kit with factory-installed features. The embodiments of the invention enable a car without a built-in factory installed Bluetooth system to perform similarly to the features of such a system. While embodiments of the invention closely mimic a factory-installed system, they differ in the respect of automatically switching from AM/FM/CD/Cassette audio feeds to Bluetooth audio feeds.

In embodiments of the invention, the driver hears the smartphone's output through the controller's speaker (added by embodiments of the invention), until the driver presses "AUX" or tunes to the optional FM transmitter's frequency, whereupon the smartphone's output is transmitted to the automobile's speakers. Embodiments of the invention allow the user to turn down the AM/FM/CD/Cassette volume when they prefer to listen to a phone call through the controller's speaker. In embodiments of the invention, the controller's speaker is of a lower fidelity than the speakers provided with most automobile stereo systems. A user can easily perform this function, i.e. opt to listen through the controller speaker, by manually turning the volume down and up or turning off the stereo.

In a preferred embodiment, the system is "universal" in that it works in all makes of cars whether or not the existing car stereo systems have aux-in ports. Embodiments support both 3.5 mm aux-in and FM transmissions to the car stereo. The user can enjoy both high-fidelity music and phone call output through built-in car stereo speakers. Embodiments of the system also have the capability to answer and place calls while the smartphone output is not playing though the stereo speakers. For example, the user hears the phone ring even when playing FM or CD music or when the stereo is off which is a problem with prior art hands-free kits. In preferred embodiments, the music gradually mutes and pauses when phone calls start.

In preferred embodiments, the modular microphone placement allows the user flexibility in configuring the system to his needs. The user can choose to place the microphone on the sun visor, dash, or even on the steering wheel. The embodiments include modular connectors and mounting systems. The microphone uses a power cord and a long life battery. The battery life of the microphone is long (days), to very long (weeks), to externally powered (essentially infinite. Microphones on prior art units are usually not placed in convenient places for connecting a power cord, but rely on their internal battery's life. With this embodiment's modular microphone placement, the microphone and speaker in the controller unit can be placed where power cords can be discretely configured. The microphone can be placed on the visor where embodiments can also attach an external battery, e.g., like those designed to extend the battery life of smartphones.

In embodiments of the invention, the system pairs easily via Bluetooth with the smartphone. An automatic Bluetooth discovery mode for pairing is executed when the base unit is turned on. The system takes care of pairing without additional user interaction by re-pairing automatically when the car power is turned off and then back on.

Embodiments of the invention incorporate a hidden base-unit, optional FM transmitter unit, and optional large FM antenna, all of which can be placed under the dash. The placement of the components under the dash allows easy access to the cigarette plug DC voltage. This placement also makes it easy to route audio connections to the car stereo's 3.5 mm AUX jack (if available).

Embodiments of the invention include an optional FM transmitter which maximizes FM reception to minimize static when the interface between the car stereo and base unit is through the FM radio. Embodiments autodetect smartphone output and play the smartphone output through one of multiple frequencies to which the FM receiver can be tuned by the user. Using multiple frequencies is advantageous if there is interference between the base unit frequency transmitting the smartphone output and an FM radio station. The user simply dials to an empty spot on the dial, one of the alternative frequencies, to eliminate the interference between the FM radio stations and the broadcast FM signal from the base unit. If the driver does not want to hear the smartphone output, but instead listen to an FM station, they can stop the music on the smartphone. Alternatively, the user can tune to a different station, while the FM transmitter from the system base unit continues transmitting through the car stereo, but there is no sound from the smartphone, as the car stereo is tuned to a different station.

FIG. 1 shows a system 100 according to some preferred embodiments. In these embodiments of the invention, all paths go through the base unit 110, with no direct path from the smartphone 130 to the controller 120. In some embodiments of the invention, the base unit 110 controls the audio paths so phone calls are not missed, and the sound from the smartphone 130 plays though the stereo 150 anytime the smartphone audio path is connected to the car stereo 150. In embodiments of the invention, some of the illustrated system components are optional and not included in the particular implementation.

As shown in FIG. 1, the base unit 110 pairs through Bluetooth to both to the smartphone 130 (normal Bluetooth pairing 115) and the controller 120 (factory Bluetooth pairing 113). In embodiments of the invention, the controller 120 can be located on the dash or visor of the car according to preferences of the user. With the base unit 110 paired via Bluetooth to both the smartphone 130 and the controller unit 120, neither the smartphone 130 nor the controller 120 unit knows when the base unit 110 changes its speaker output between the car stereo speakers 152 and the system controller's speaker 122. In preferred embodiments, the base unit 110 can change the audio out destination as needed.

The controller 120 is factory-paired via Bluetooth with base unit 110 in preferred embodiments to bypass issues with the Bluetooth protocols where the smartphone 130 pairs directly with the control unit 120 and then after a phone call terminates, and the system cannot reestablish an audio path from the smartphone 130 to the stereo 150. As configured, the user of the system 100 does not miss calls when the base unit output is not connected to the car stereo speakers 152, and automatically switches the smartphone output to the controller's speaker 122 when the smartphone's output cannot be connected to or detected at the stereo's speakers 152. The smartphone output cannot be connected to the car stereo speakers 152 when the car stereo 150 is not set to the AUX input in the wired embodiment, or to the appropriate preset FM station in the FM transmitter embodiment. Either of these conditions can be sensed by the base unit 110.

In preferred embodiments, the smartphone input and output is transmitted to the system 130, due to the smartphone 130 pairing with the base station 110 over Bluetooth. In these embodiments, the smartphone 130 pairs only with the base unit 110 and the controller 120 is factory paired to the base unit. The controller 120 controls the speaker 122 and microphone 124 which are part of the controller 120. Thus, the base unit 110 is in control of the audio routes; it can route the controller microphone 124 to the smartphone's input. Also, in preferred embodiments, the base unit 110 attempts to route the smartphone's output to the stereo speakers 152. The base unit 110 constantly tests if the smartphone 130 is outputting through the stereo speakers 152. If not, and the base unit 110 cannot route the smartphone output to the car stereo speakers 152, it routes the smartphone's output to the controller speaker 122.

Thus, if a phone call comes while the smartphone's output cannot be heard through the stereo speakers 152, the phone call can be heard through the controller's speaker 122. If, and when, the base unit 110 detects that the smartphone output can be routed through the stereo speakers 152, in preferred embodiment, the base unit 110 reestablishes that route. The base unit 110 dynamically determines if the user can hear smartphone's output through the stereo's speakers 152. In a preferred embodiment, the base unit 110 periodically plays an inaudible tone, e.g., outside the normal range of human hearing, through the car stereo's 3.5 mm AUX jack or though the optional FM transmitter 140. If the base unit 110 detects the tone through the controller's microphone 124, it switches the output to the stereo 150. Otherwise, the base unit 110 switches the smartphone output to the controller speaker 122.

Referring to FIG. 1, preferred embodiments of the invention have the system elements packaged in the following components: The base unit 110 which is powered by the car's DC power 135A. The base unit 110 connects through a USB power cable 118 using an adapter which fits in a cigarette lighter plug. The base unit 110 has an on-off switch 116 which initiates the pairing mode when the base unit 110 is turned on. The base unit 110 continues the pairing mode until paired with the controller 120 and smartphone 130. In embodiments, the base unit 110 also has a wire 112 equipped a 3.5 mm jack which can plug into a 3.5 mm stereo jack. Another wire 114 plugs into an optional FM transmitter 140. The base unit 110 is factory-paired Bluetooth 4.0 to the controller 120 and normally paired Bluetooth 4.0 to smartphone. The factory paired transmission path 113 and the normally paired transmission path 115 are illustrated as dotted lines in the figure. In preferred embodiments, the base unit 110 is generally located under the dash. An under dashboard mount may be included for discrete placement of the base unit as part of a kit.

The controller 120 is factory Bluetooth paired to base unit 110. In preferred embodiments it includes a high-fidelity, sound-canceling microphone 124 for placing phone calls and a low-fidelity speaker 122 which is used when the smartphone output cannot be routed to the stereo speakers 152. The stereo speakers 152 may be unavailable because the stereo 150 is off, playing the radio, or playing CDs, among other reasons. Between the controller speaker 122 and the car stereo speakers 152, the base unit 110 always has a method of notifying the driver that a phone call is coming in. In preferred embodiments, the controller 120 has a large pushbutton 126 to be used to answer an incoming call or to terminate a call, e.g., by pressing the pushbutton. The pushbutton 126 and other controls 127, 128, 129 on the controller 120 can be used to control functions on the smartphone 130 via the base unit 110. A dial (not pictured) can adjust the smartphone's output volume. The pushbutton 126 if pressed and held can to initiate voice recognition, if available, on the smartphone 130. If pressed twice, the pushbutton 126 will cause the smartphone 130 to automatically call back the previous outgoing call. Additional buttons for smartphone control include music player controls, e.g., Play/Pause, ">" 129, Previous song "<<", 127, Next song ">>" 128. Embodiments of the invention use Audio/Video Remote Control Profile (AVRCP) technology so that the controller 120 can communicate with the base unit 110. Other features of the controller 120 include an internal rechargeable battery 123, a USB power cord 125 to connect to car's DC power 135B, a connection to an external rechargeable battery (not pictured), an on-off switch (not pictured) and modular mounting hardware such as a visor-clip mount 132 and a dashboard mount 134.

In a preferred embodiment, other items which are present in a kit for installation of the system include a triple-USB-socket power adapter (not pictured) for insertion in a cigarette lighter socket which supplies DC voltage, two USB power cords—one for the base unit 110 and one for the mic/speaker/controller unit 120, modular 3.5 mm audio cord(s) 112, 114 one of which plugs into the base unit 110 and plugs into the 3.5 mm AUX stereo jack and one of which plugs into the base unit and plugs into the 3.5 mm FM transmitter jack. These cords are preferably standard type cords so that they can be easily replaced with different-length $3^{rd}$ party cords. When a triple-USB-socket power adapter is used, the base unit 110, the controller 120 and the FM transmitter 140 can all be powered by the same lighter socket 135, that is, 135A, B and C would merge in the diagram.

The optional FM transmitter includes an FM transmitter unit 140, an under-dash mounting unit for the FM transmitter (not pictured), a large external FM antenna 142, an under-dash mounting unit for the FM antenna (not pictured) and a power cord 143 to be installed to the car's DC voltage 135C. A manual (not pictured) can be supplied to aid in installation and operation of the system.

The system 100 pairs easily via Bluetooth with the smartphone 130. The system enters discovery mode when the power switch is turned on. In preferred embodiments, the base unit 110 does not impair with the smartphone 130 while in pairing mode. In alternative embodiments, the base unit 110 unpairs if the controller's large button 126 is pressed for, for example, ten seconds. The controller 120 and base unit 110 are factory paired. In preferred embodiments, the controller 120 and base unit 110 never unpair.

Figure 2:
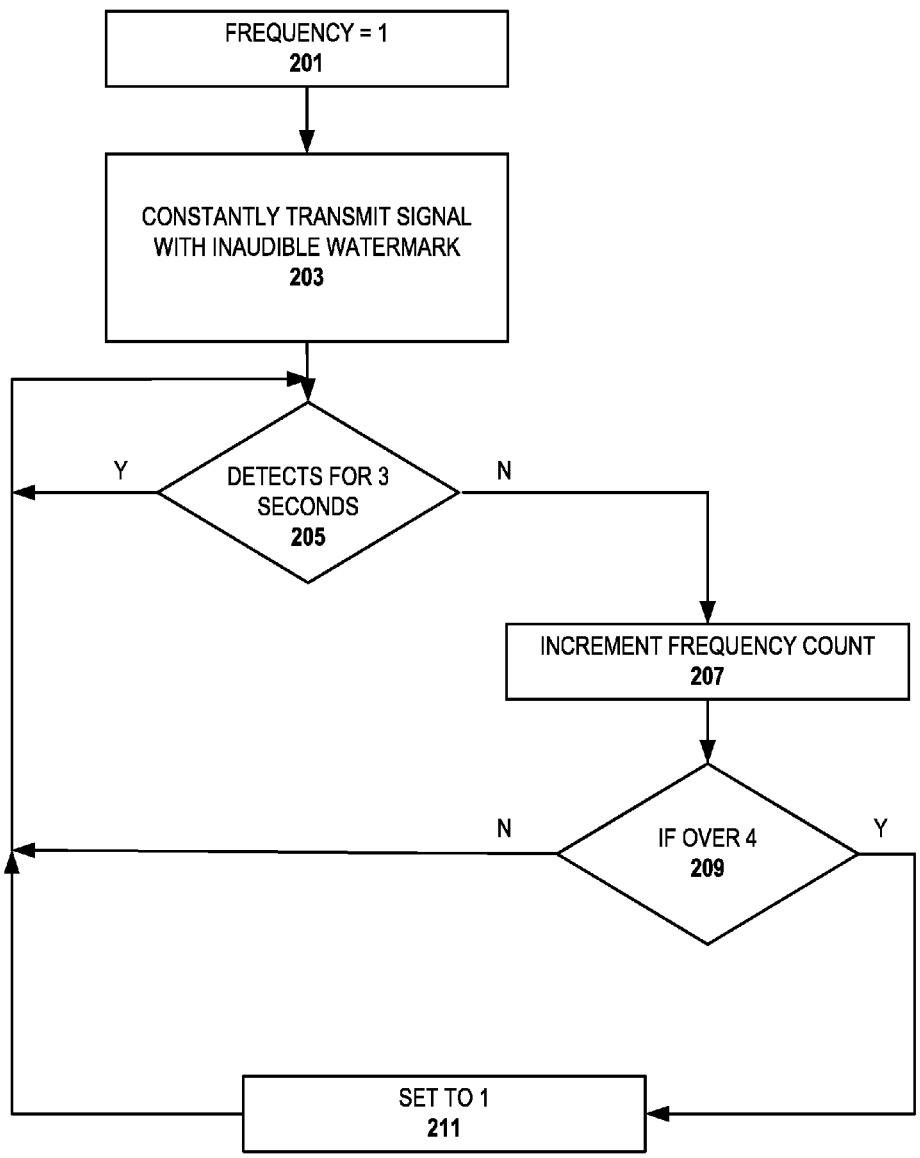
FIG. 2 is a flow chart showing system detection of a user selection of a stereo frequency in some embodiments of the invention.

FIG. 2 is a flow chart showing system detection of a user selection of a stereo frequency in some embodiments of the invention. In the drawing, the driver has selected one of a plurality of preset frequencies and the system base unit finds the selected frequency. The user selects one of these frequencies without station interference. In the illustrative embodiment, there are four factory-set frequencies in the low band of the dial, e.g., 88.3, 88.7. 89.1, and 89.5. In step 201, the frequency of the base unit is set to the first preset frequency. The base unit constantly listens for the inaudible signal or "watermark", step 203, and if not detected, changes the frequency to the next of the presets in sequence. As discussed below with reference to FIG. 4, in preferred embodiments, the base unit uses the FM transmitter and FM antenna to transmit on the frequencies in sequence with the listening.

In the following steps, the system searches through the four frequencies until it detects the watermark which is being transmitted. In step 205, the system listens for the watermark for a period of time, e.g., three seconds, before changing frequencies. If the system detects the watermark signal in step 205, the system knows that the smartphone output can be routed to the car speakers. The monitoring continues since a condition may change with the car stereo making the car stereo speakers unavailable to the smartphone output. If the system has not detected the watermark signal, it round robins through the frequencies. In step 207, it increments the frequency count. If the frequency count is not over four, step 209, the system returns to listen for the inaudible watermark signal through the sound that is playing, step 205. If the frequency count is over 4, in step 211, the frequency count is set to 1 so that the system can continue to round robin through the frequencies transmitting and listening for the watermark.

Figure 3:
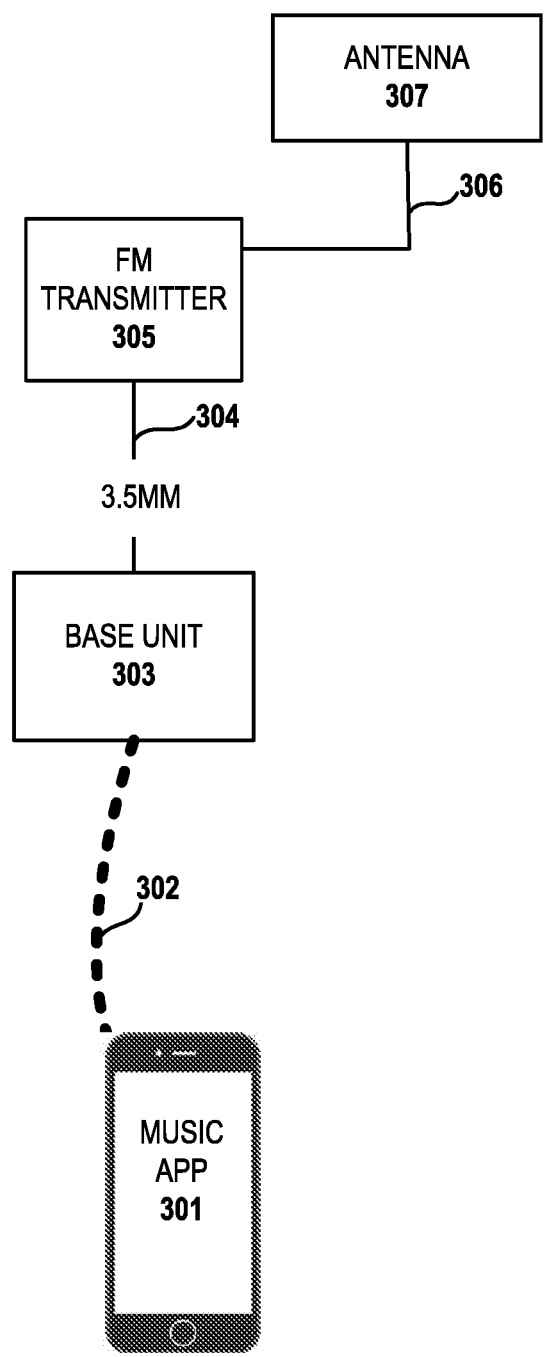
FIG. 3 shows a preferred embodiment of the invention which includes a Large FM antenna under the dash for minimum interference.

FIG. 3 shows that some embodiments of the invention include a large FM antenna 307 under the dash for minimum interference. In the drawing, the system is operating in a music mode where a music app is playing on the smart phone 301. The output of the smartphone 301 is received by the base unit 303 by means of the Bluetooth connection 302. The base unit 303 forwards the music output by means of a cable 304 with standard 3.5 mm jacks to the FM transmitter 305. The FM transmitter 305 transmits the smartphone output, e.g., music output, on a user selected FM frequency via cable 306 to the FM antenna 307 so that the FM signal can be received by the car stereo and played on the car stereo speakers (both not pictured).

Figure 4:
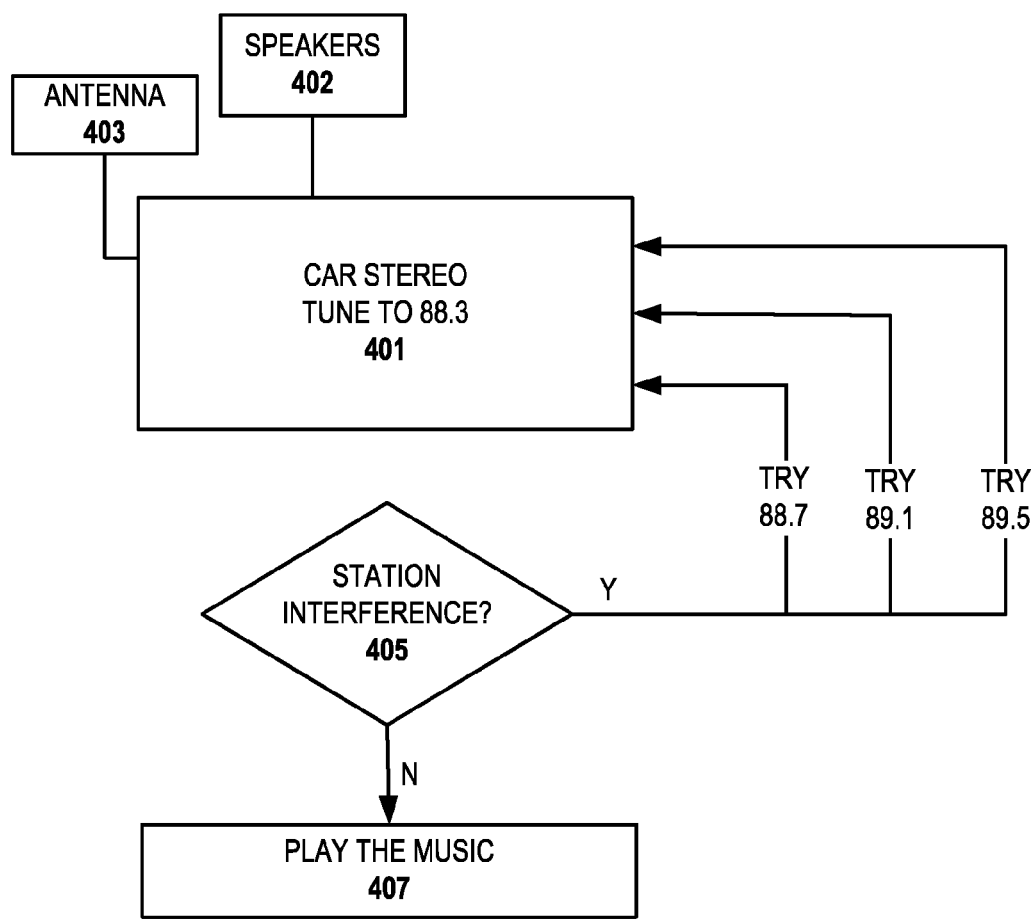
FIG. 4 shows a flow diagram of the process that the user goes through a plurality of frequencies to look for a preset frequency without interference.

FIG. 4 shows the process that the user goes through in tuning the FM transmitter successively through a plurality of frequencies looking for a frequency that does not have interference. As discussed above, the system goes through a parallel process to determine which frequency the user has selected. As shown, the car stereo 401 is tuned to the first preset frequency, e.g., 88.3. The car stereo 401 plays the signal it receives from antenna 403 on speakers 402. The user initially tunes the system to the first preset, e.g., 88.3, and then determines whether there is station interference in step 405 by listening to the output of the speaker. If there is station interference, the user will try a succession of the preset stations, e.g., 88.7, 89.1, 89.5, until one of the presets is found without station interference. Then, in step 407, once a station without interference is found, the smartphone music output is played through the car stereo 401.

Figure 5:
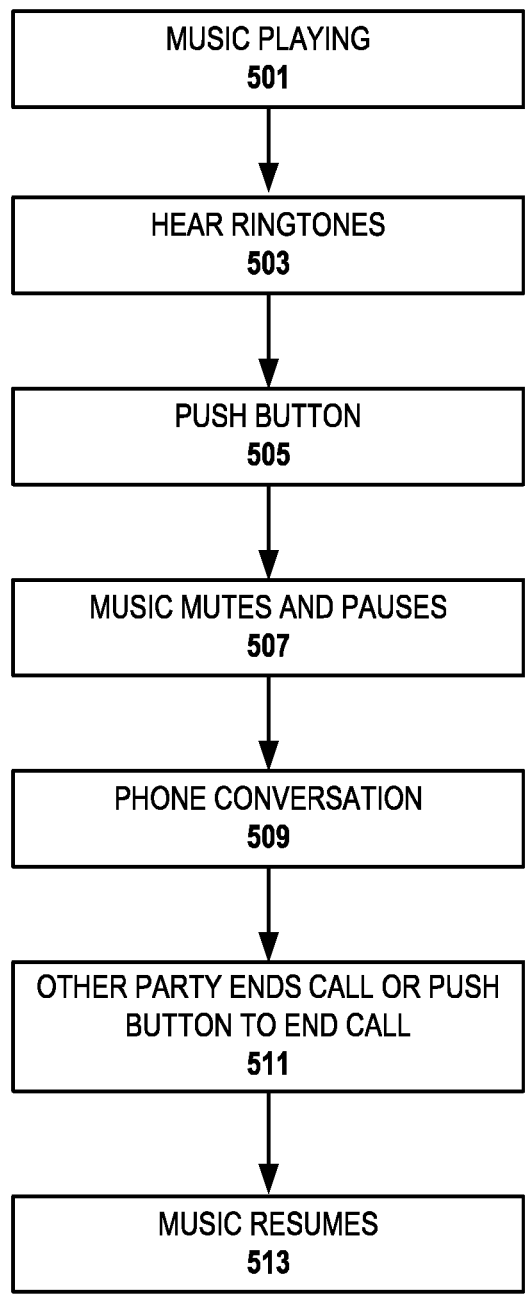
FIG. 5 depicts a flow diagram showing a phone call procedure according to some embodiments.

FIG. 5 shows a phone call procedure according to an embodiment for the user to answer the phone hands free using the system. Some embodiments provide multiple modes for placing and answering phone calls. As illustrated, in step 501, music is playing from the smartphone output. In step 503, ringtones are heard by the user. If the user wants to take the call, the user can activate the controller by pressing the main button, step 505. In step 507, the music mutes and pauses and the phone conversation takes place, step 509. The phone call ends either by the other party ending the call, or the user pushing the main button to end the call, step 511. After the call ends, the music resumes from the smartphone output, step 513.

Figure 6:
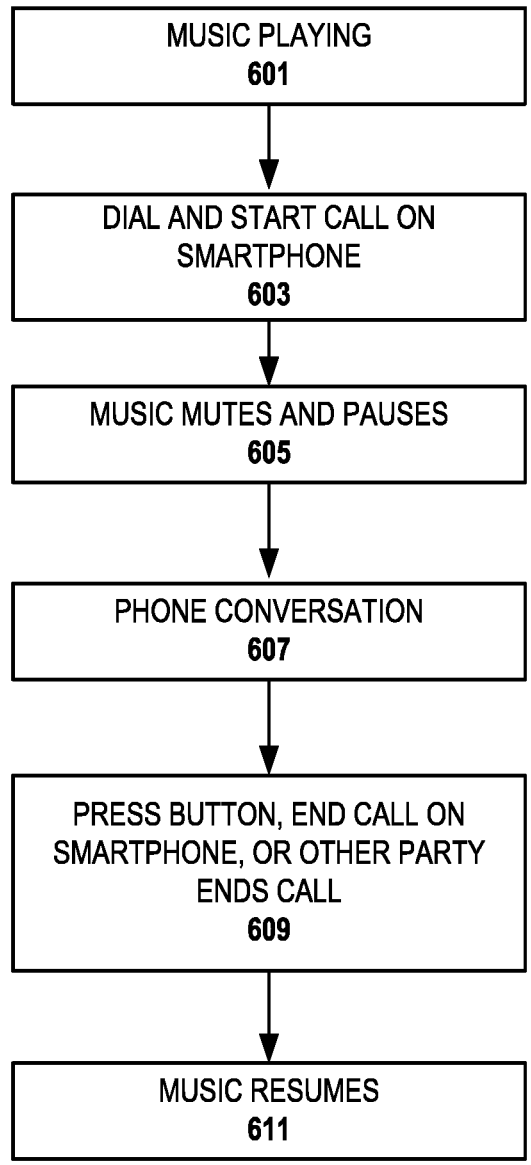
FIG. 6 depicts a flow diagram showing a phone call procedure according to some embodiments.

FIG. 6 shows a phone call procedure according to an embodiment in which the user manually dials a phone number (not hands free). As shown in the drawing, the music is playing in step 601. The user wishes to make the call and begins dialing to start the call on the smartphone in step 603. In step 605, the music mutes and pauses and the phone conversation takes place, step 607. The phone call ends either by the other party ending the call, or by the user pushing the main button to end the call, step 609. After the call ends, the music resumes from the smartphone output, step 611.

Figure 7:
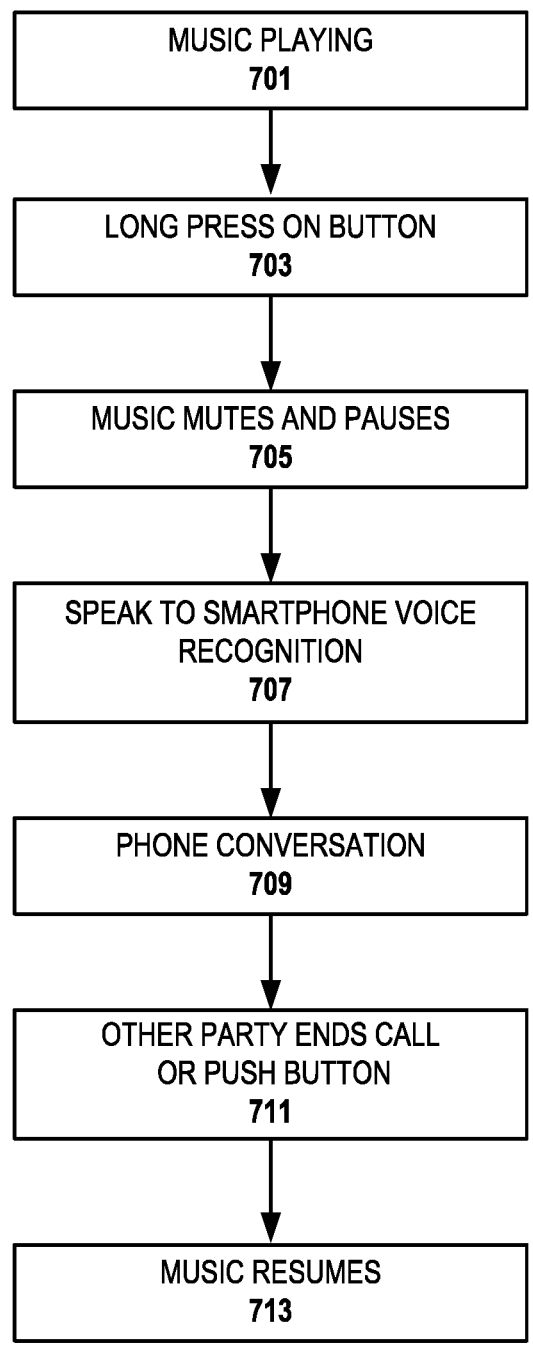
FIG. 7 depicts a flow diagram showing a phone call procedure according to some embodiments.

FIG. 7 shows a phone call procedure according to an embodiment where the user places a call using voice recognition (hands free). In step 701, the music from the smartphone is playing. In step 703, the user wishes to invoke voice recognition dialing from the smartphone, so the user executes a long press on the main button of the system controller. The music mutes and pauses, step 705. The user can now use the controller microphone to communicate back to the smartphone to utilize the smartphone voice recognition function in step 707. The phone conversation takes place, step 709. The phone call ends either by the other party ending the call, or the user pushing the main button to end the call, step 711. After the call ends, the music resumes from the smartphone output, step 713.

Figure 8:
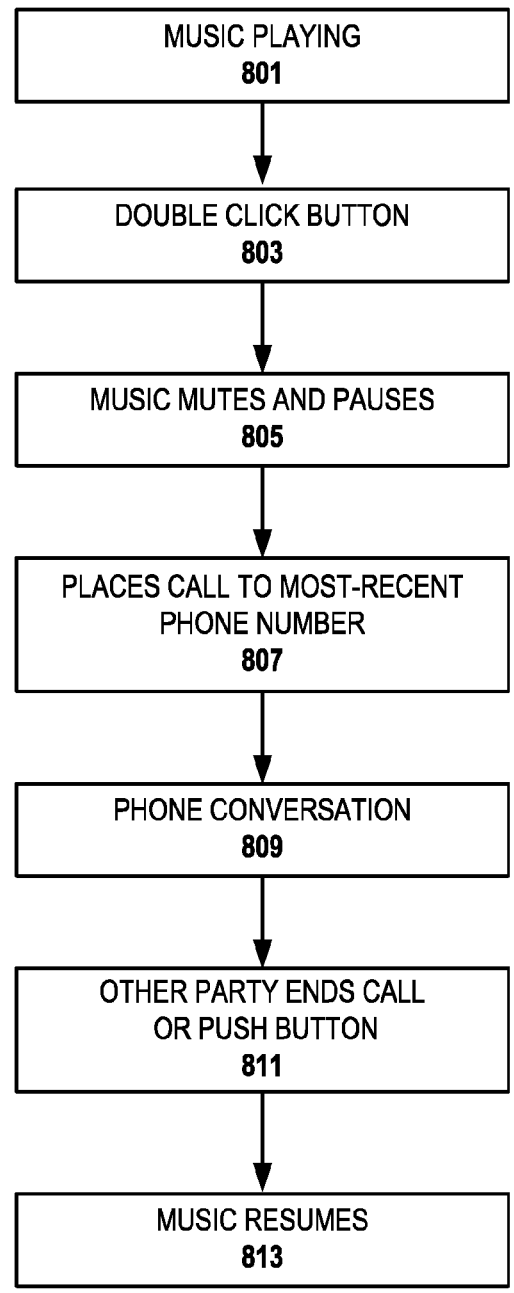
FIG. 8 depicts a flow diagram showing a phone call procedure according to some embodiments.

FIG. 8 shows a phone call procedure according to embodiment which places a call to a most recently called phone number (hands free). In step 801, the music is playing from the user's smartphone. In step 803, the user double clicks the main button of the controller. In step 805, the music mutes and then pauses. The system then places that phone call to the most recently called phone number, step 807. The phone conversation takes place, step 809. The phone call ends either by the other party ending the call, or the user pushing the main button to end the call, step 811. After the call ends, the music resumes from the smartphone output, step 813.

Figure 9:
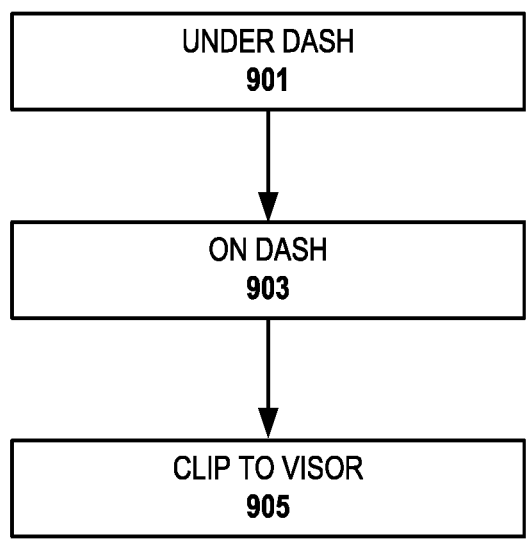
FIG. 9 shows a guideline for suggested equipment placement according to some embodiments.

FIG. 9 shows a guideline for suggested equipment placement according to some embodiments. In step 901, the user looks to install the system components under the dash. Generally speaking, installing the larger system components, the base unit, the optional FM transmitter and the optional FM antenna will result in a more aesthetically pleasing installation. So while these system components could be installed on the dash or elsewhere in the automobile, it is recommended that they be installed under the dash using the under dash mounts optionally provided in the kit. In step 903, the user looks to install some of the system components on the dash. Although the larger system components could be installed on the dash, it is recommended that the system controller should be installed on the dash. In some vehicles, the controller could be installed on the steering wheel. In step 905, the user looks to install at least some of the system components clipped to the visor. Another possible placement of the controller is to clip it to the visor. Although this placement is somewhat disadvantageous for the use of a power cord, the placement can be ameliorated by using a third party battery life extender, similar to those used for cell phones. However, a USB power cable could be run from this position. As a more finished installation, rather than using the existing lighter power connection, a new lighter power connection could be installed to car power under the dash, effectively hiding the power connections to components mounted under the dash. A new power connection is a relatively low cost item in a professional installation.

Figure 10:
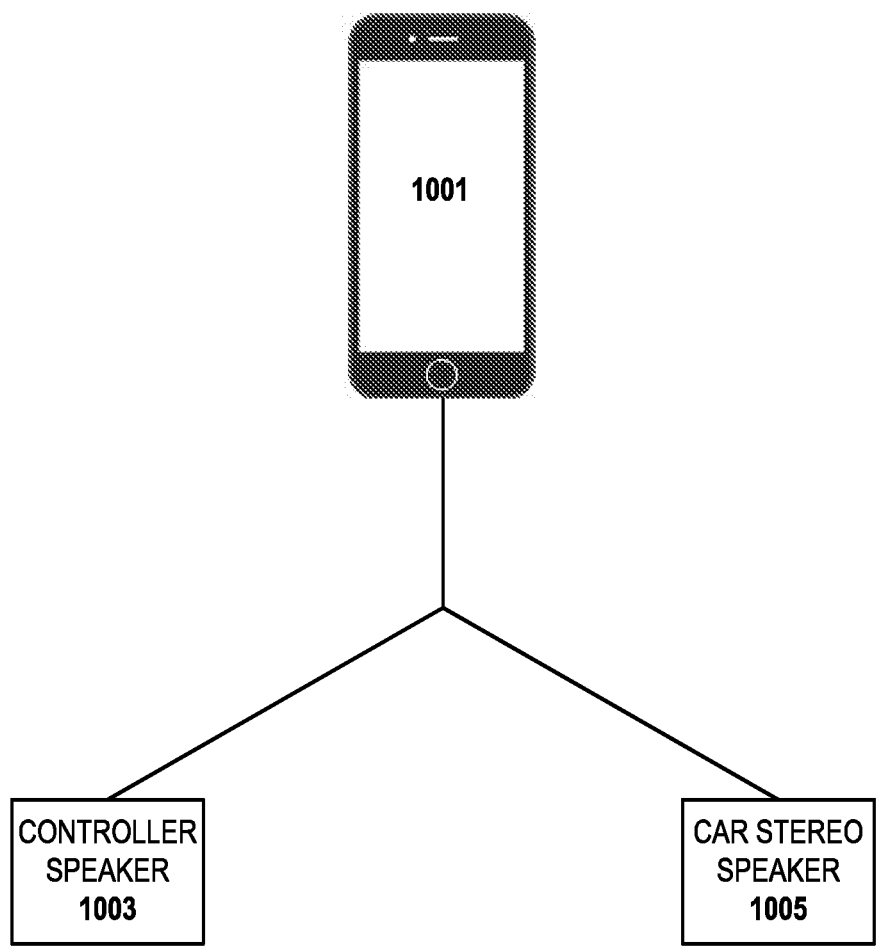
FIG. 10 is a diagram showing that the system connects the incoming phone signals to either the car stereo or to the controller speaker.

FIG. 10 shows a diagram that the system connects the incoming phone signals to either the car stereo or to the controller speaker. This drawing is included to illustrate that the smartphone 1001 output is always provided an output to either the controller speaker 1003 or the car stereo speakers 1005. If available, because of their higher fidelity, the car speakers 1005 are preferred. However, if they are not available, because for example that music from the FM tuner or the CD player is playing, the controller speaker 1003 is provided as part of the system as a backup speaker.

Figure 11:
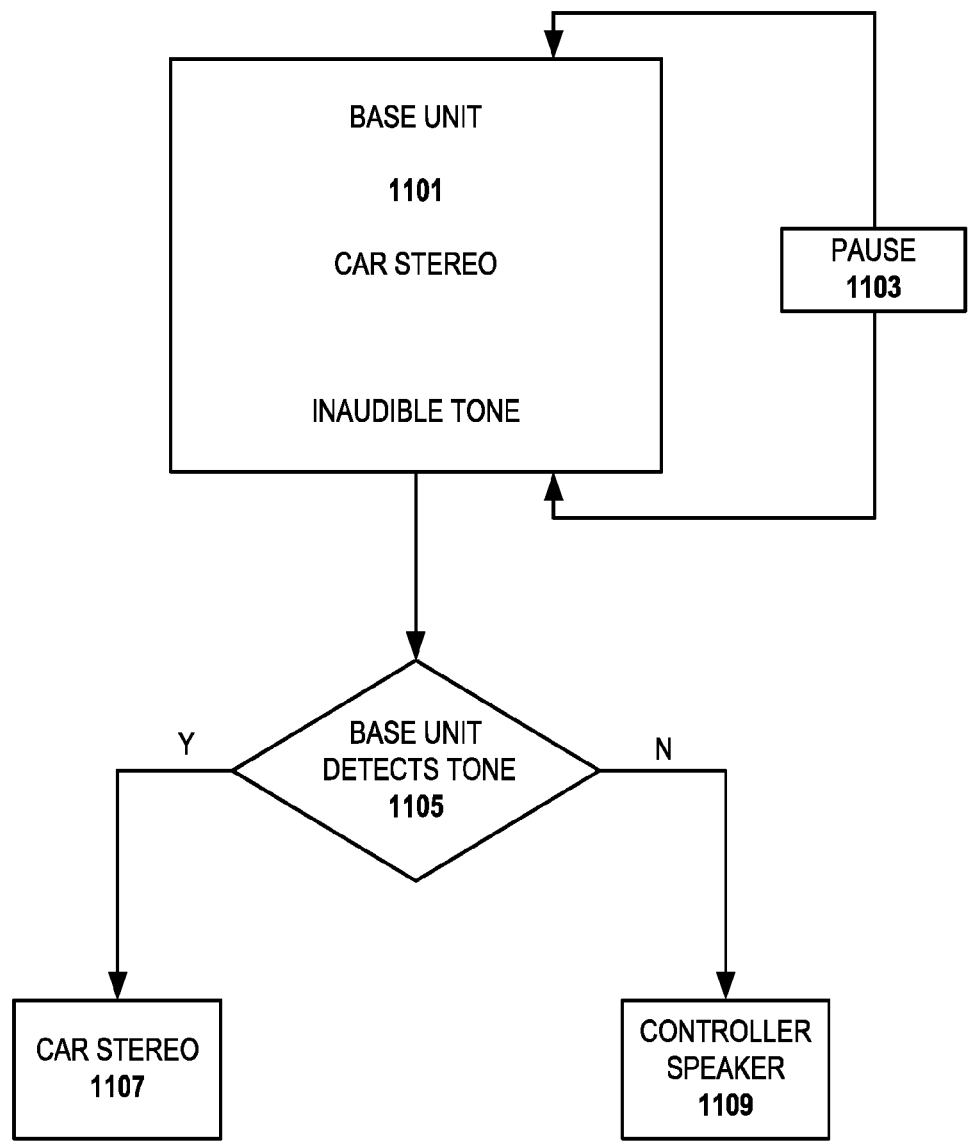
FIG. 11 shows a flow diagram of a preferred embodiment of the invention in which the system constantly checks whether to direct sound to the stereo or the controller.

FIG. 11 shows a flow diagram that indicates, in some embodiments, the system constantly checks if it should pipe sound to the stereo or the controller speaker by inserting a watermark in the sound and detecting it. In the figure, box 1101 represents the process of the base unit inserting the inaudible tone and then attempting to detect it from the car speakers. The inaudible tome can be detected whether the connection between the base unit and the car stereo is via a cable, e.g., to the auxiliary selection mode on the car stereo, or via the pre-set FM station and the FM transmitter. In box 1103, the system is simultaneously transmitting the inaudible tone to the car stereo and attempting to detect it. In box 1105, the decision is made whether the base unit was successful in detecting the tone. If so, the base unit knows to direct a potential call to the car stereo 1107. If not, the base unit knows to direct the potential call to the controller speaker 1109.

The foregoing description of the embodiments has been presented for purposes of illustration only. It is not exhaustive and does not limit the embodiments to the precise form disclosed. Those skilled in the art will appreciate from the foregoing description that modifications and variations are possible in light of the above teachings or may be acquired from practicing the embodiments. For example, the described steps need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents.

The invention claimed is:

1. A hands-free Bluetooth system comprising:
    a base unit; and
    a controller unit;
        wherein the controller includes a built-in speaker, a built-in microphone and a control button configured to receive an action from a user and transmit to the base unit a signal corresponding to the action and is configured to:
            automatically pair through Bluetooth to the base unit;
            direct audio signals received from the base unit to the built-in speaker; and
        wherein the base unit is configured to:
            pair through Bluetooth to a smartphone;

connect to an audio system through an audio connection;

upon receiving a signal for an incoming call through the smartphone, test whether the base unit is connected to the speaker of the audio system;

if connected, direct the incoming call to the audio system; and if not connected, direct the incoming call to the controller.

2. The system of claim 1, wherein during a phone call:

the controller is configured to send audio signals received through the built-in microphone to the base unit; and the base unit is configured to transmit audio signals received from the controller to the smartphone.

3. The system of claim 1, wherein when not handling a phone call, the base unit is configured to direct audio signals received from the smartphone to the audio system.

4. The system of claim 1, wherein the base unit is configured to test whether the base unit is connected to the speaker of the audio system by:

sending a signal through the audio connection;

detecting whether the signal was received by the built-in microphone; and passing the test, indicating that the signal was received by the built-in microphone.

5. The system of claim 1, wherein:

during a phone call, the base unit is configured to test whether the base unit is connected to a speaker of the audio system; and if connected to the speaker of the audio system, direct smartphone audio signals to the audio system.

6. The system of claim 1, wherein the audio connection includes a wired connection to the audio system.

7. The system of claim 1, wherein the audio connection includes a wireless connection to the audio system.

8. The system of claim 7, wherein the wireless connection includes a radio wave connection.

9. The system of claim 1, wherein the base unit is further configured to be powered through a power system of the car.

10. The system of claim 1, wherein the audio system of the car is a stereo system.

11. The system of claim 1, wherein the signal corresponding to the action transmitted from the controller to the base unit indicates at least one of:

answer the incoming phone call;

ignore the incoming phone call; and end an incoming phone call.

12. The system of claim 1, wherein the controller further includes a dial for sending a volume adjust signal to the smartphone through the base unit.

13. A method for operating a hands-free Bluetooth system including a base unit and a controller unit including a built-in speaker, a built-in microphone and a control button, the method comprising:

automatically pairing the controller unit through Bluetooth to the base unit;

directing, by the controller, audio signals received from the base unit to the built-in speaker;

pairing the base unit through Bluetooth to a smartphone;

connecting the base unit to an audio system through an audio connection;

testing whether the base unit is connected to the speaker of the audio system;

if connected, direct an incoming call from the smartphone to the audio system; and if not connected, direct the incoming call to the controller.

14. The method of claim 13, wherein during a phone call, the method further comprises:

sending audio signals received through the built-in microphone of the controller to the base unit; and transmitting, by the base unit, audio signals received from the controller to the smartphone.

15. The method of claim 13, wherein when not handling a phone call, the method further comprises directing, by the base unit, audio signals received from the smartphone to the audio system.

16. The method of claim 13, further comprising:

testing whether the base unit is connected to the speaker of the audio system by:

sending a signal through the audio connection;

detecting whether the signal was received by the built-in microphone; and passing the test, indicating that the signal was received by the built-in microphone.

17. The method of claim 16, further comprising during a phone call, responsive to passing the test, directing smartphone audio signals to the audio system.

18. The method of claim 13, further comprising:

detecting a signal transmitted from the controller to the base unit;

determining that the signal indicates at least one of:

answer the incoming phone call;

ignore the incoming phone call; and end an incoming phone call.

19. The method of claim 13, wherein the controller further includes a dial, and the method further comprises sending a volume adjust signal to the smartphone through the base unit.

* * * * *